Patented July 23, 1935

2,008,995

UNITED STATES PATENT OFFICE 2,008,995

PROCESS OF COLLOIDIZING CELLULOSE ACETATE WITH ETHYLENE CHLORIDE

Cyril J. Staud and Louis M. Minsk, Rochester, N. Y., assignors to Eastman Kodak Company, Rochester, N. Y., a corporation of New York No Drawing. Application July 28, 1931, Serial No. 553,698

4 Claims. (Cl. 106—40)

The present invention relates to a process of dissolving or colloidizing cellulose acetate with ethylene chloride alone by employing it at an elevated temperature.

It has been previously thought by those skilled in the art that ethylene chloride could not be employed alone as a solvent for cellulose acetate at any temperature. As a consequence, when ethylene chloride has been employed heretofore for making products from cellulose acetate, it has been employed in combination with another solvent to form a solvent mixture which will dissolve cellulose acetate at ordinary temperatures. The mixing of two volatile liquids obviously creates a problem of purification in any case where it is desired that they be subsequently separated. The liquids most commonly employed with ethylene chloride in the colloidizing of cellulose acetate are methyl and ethyl alcohol. In the case of ethyl alcohol and ethylene chloride, the boiling points are only separated by a difference of 5½ degrees on the centigrade scale so that ordinary distillation will not effectively separate the alcohol from the alcohol-ethylene chloride mixture. When a solvent mixture is employed, problems of maintaining the same relative proportions of the ingredients of the mixture, in each successive dissolving of cellulose acetate, become important to obtain uniformity of results. Also, in the cases where solvent mixtures are employed, there must be a proper and careful choice of the components used in the solvent mixture since "blushing" of the resulting product must be avoided.

We have found that ethylene chloride may be employed alone as solvent for cellulose acetate under certain conditions, and that a solution of cellulose acetate therein possesses valuable properties resulting in products of an excellent character.

We have found that if a suspension of cellulose acetate in ethylene chloride is warmed, the cellulose acetate forms a clear solution which, upon cooling, gives a gelatinized or colloidized product.

We have found that the colloidized cellulose acetate products from an ethylene chloride solution obtained by coating, spraying, dipping or moulding processes, are extraordinarily clear and free from haze. This phenomenon is believed to be due to the fact that ethylene chloride forms an azeotropic boiling mixture with water so that any water that may be present and which would cause "blushing" or "haze" is removed by the ethylene chloride itself.

We have found that by our process the gelatinizing of cellulose acetate may be effected at a considerable saving over the methods now employed. At the present time, ethylene chloride is readily available as it is produced in large quantities and, consequently, its use is more economical than some other solvents for cellulose acetate, such as acetone, which are employed at the present time. At the present time, the price of acetone is double that of ethylene chloride which makes the cost of cellulose acetate products higher than is necessary when ethylene chloride is employed as a solvent according to our present process.

Our process broadly comprises the dissolving of cellulose acetate in ethylene chloride at an elevated temperature, thus producing a solution of various possibilities, the employment of which depends on what product is desired.

The following specific example is given to illustrate the application of our invention to the formation of film:

50 lbs. of cellulose acetate having an acetyl content of between 39.5 to 44.0% and of viscosity from 5 to 500 seconds was suspended in about 480 lbs. of ethylene chloride. The suspension was warmed to about 40–60° C. with vigorous agitation until the cellulose acetate was completely dissolved. The solution or "dope" thus obtained was then spread or coated on a glass plate, yielding a clear, highly transparent sheet, after the evaporation of the solvent at room temperature. Obviously, if the dope is not used immediately, it will jell upon cooling, so that the solution must either be maintained at an elevated temperature until used or, if a jell has formed, it must be warmed to liquefy it.

If the cellulose acetate which is employed in the above example has been produced by the acetylation of the cellulose at temperatures higher than those usually employed in acetylating reactions, the cellulose acetate formed after hydrolysis or partial de-esterification may be dissolved in ethylene chloride at lower temperatures. For example some cellulose acetates may be dissolved at temperatures between 30–40° C. and these solutions can be employed for forming sheets etc. by coating them out on a smooth, polished surface.

In the case of the cellulose acetates having an acetyl content below 39.5% as given in the example, it has been found that the acetates, that are soluble in ethylene chloride at reasonably elevated temperatures such as specified in the example, are those of low viscosity. We have found however, that cellulose acetates of as low an acetyl content as 36% or even less may be employed according to our invention to produce valuable cellulose acetate products.

The film or sheet produced according to the example given exhibits a flexibility and stability comparable to other high grade cellulose acetate films. It may be employed in photography, for wrapping purposes (especially in the form of thin sheets) or for any other purpose where a tough, impermeable, flexible and transparent membrane is required.

Our solution may be employed for waterproof overcoatings for various materials. For example, sheets or layers of cellulose acetate, nitrate, regenerated cellulose or cellulose ethers may be coated with the warm solution; as this solution cools and jells upon coming in contact with the surface which is to be coated there is little, if any, solvent action by the ethylene chloride on the already formed sheet.

The solution of cellulose acetate in ethylene chloride according to our process may be employed as a lacquer to coat various objects and materials. It is desirable in any case where the ethylene chloride solution of cellulose acetate is employed to overcoat materials that a gum (such as an ester gum) or a compatible resin be added thereto to promote the adherence of the overcoating to the surface. If desired, pigments, fillers, or plastic materials which are compatible with the solution may be added to enhance the appearance or utility of the surface. For example, if moisture-proofing is highly important, a gum and a wax would both be desirable in the overcoating and, consequently, they should be added to the ethylene chloride solution so that the overcoating formed may embody these materials. In most cases it is desirable to incorporate a plasticizer such as triphenyl or tricresyl phosphate in the solution for the production of self-supporting sheets or where the solution is employed for overcoating surfaces.

Obviously, surfaces may be coated by a pigmented (or unpigmented, for that matter) nitrocellulose lacquer and the nitrocellulose layer formed may then be overcoated with cellulose acetate by means of its solution in ethylene chloride which may be applied, for example, by spraying.

A solution of cellulose acetate in ethylene chloride may be employed to coat fabrics including those that are so loosely woven that the areas between the threads contain a transparent window of cellulose acetate, such material being suitable where a cheap but substantial and non-shatterable window is desirable, such as in greenhouses, poultry houses, etc. Closely woven fabrics may also be coated with cellulose acetate by means of its solution in ethylene chloride to form waterproof and weather proof materials or in the manufacture of artificial leather. Paper may also be coated by cellulose acetate from its ethylene chloride solution, on one or both sides to strengthen it and impart qualities of resistance to it which it does not possess except when specially treated in some manner.

Laminated glass which contains one or more layers of cellulose acetate may be produced by our process. For instance, two sheets of glass may each be coated on one side and pressed together while the inner layer of cellulose acetate on each is still in the jell form. If desired, the glass sheets may be first coated with gelatine and then the layer of cellulose acetate from ethylene chloride may be applied to either one or both of the gelatine layers and the sheets may then be pressed together to form a unitary sheet of laminated glass.

Bottles or other containers or article of easily broken material may be coated with a layer of cellulose acetate from its solution in ethylene chloride. Such a layer will prevent chipping or scaling of the outer surface of the container as well as increasing the tensile strength of the articles as a whole. A breakable container coated with cellulose acetate from its ethylene chloride solution will resist a much harder blow than when it is uncoated.

Artificial silk may be produced from an ethylene chloride solution of cellulose acetate by extruding it through an orifice either into a precipitating or coagulating liquid, or by extruding it in the form of filaments into either a current of warm or cool air. We have found that the artificial silk produced by forming the filaments in a current of cool air, in which gelation of the cellulose acetate takes place before the solvent is all evaporated off gives threads of fine quality. As pointed out previously, products from the ethylene chloride solution of the cellulose acetate are free from haze and blushing and this applies also to the artificial silk produced by either the warm or cool air methods.

In the production of any of the products specified above, plasticizers may be incorporated in the solution to give the products greater suppleness or flexibility. Any of the known cellulose acetate plasticizers, such as the triaryl phosphates, dibutyl phthalate, etc. may be employed as desired. Various plastic materials such as oils, fats, waxes, gums, compatible resins, higher esters of cellulose such as cellulose stearate, cellulose acetate-propionate, either in unhydrolyzed, or hydrolyzed form such as disclosed and claimed in Malm and Fletcher application Serial No. 551,546, cellulose acetate-stearate, may be incorporated in the ethylene chloride solution of cellulose acetate where desired in accordance with the use to which the solution is to be put.

Various other modifications and applications of our invention will be apparent to those skilled in the art, and come within the scope of the present application.

What we claim as our invention is:

1. A homogeneous composition comprising cellulose acetate and ethylene chloride as the solvent for the cellulose acetate.

2. In a process of colloidizing a partially hydrolyzed cellulose acetate the step which comprises dissolving it in ethylene chloride at a temperature of at least 30° C.

3. In a process of colloidizing a partially hydrolyzed cellulose acetate the step which comprises dissolving it in ethylene chloride at a temperature of at least 40°–60° C.

4. In a process of colloidizing a partially hydrolyzed cellulose acetate the step which comprises dissolving it in ethylene chloride at a temperature of approximately 60° C.

CYRIL J. STAUD.
LOUIS M. MINSK.